May 21, 1968     T. GARY DRAYER ET AL     3,383,842
PIVOT LOCK MECHANISM FOR CORN PICKERS

Filed Aug. 2, 1965     4 Sheets-Sheet 1

Inventors:
T. Gary Drayer
John L. VandeWiele

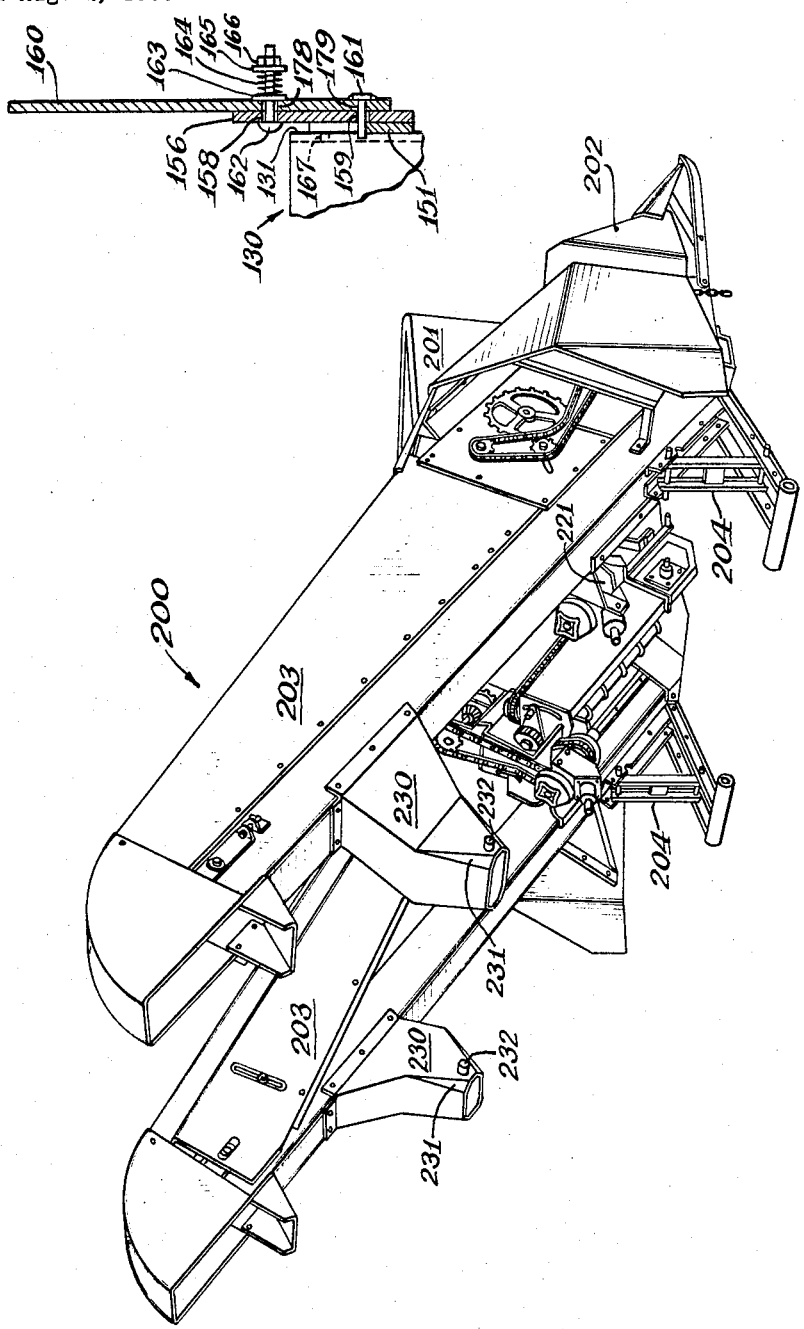

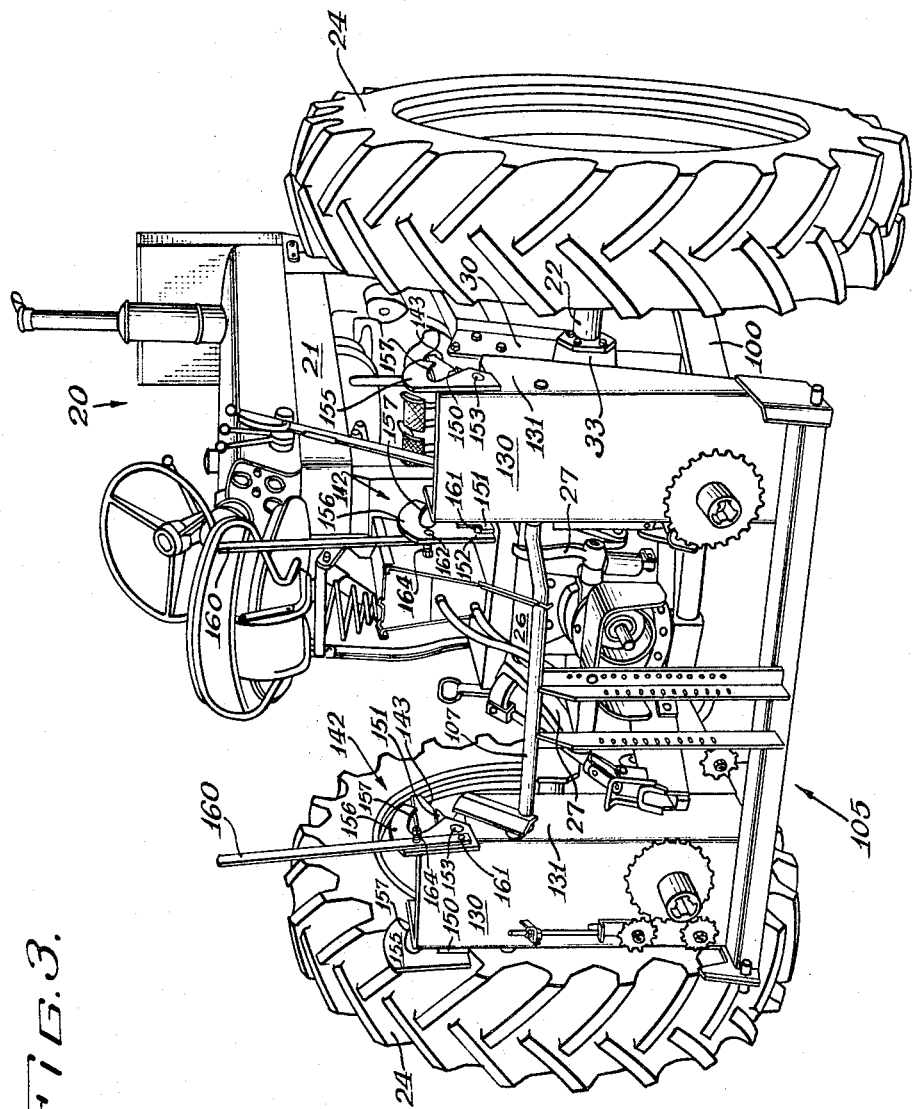

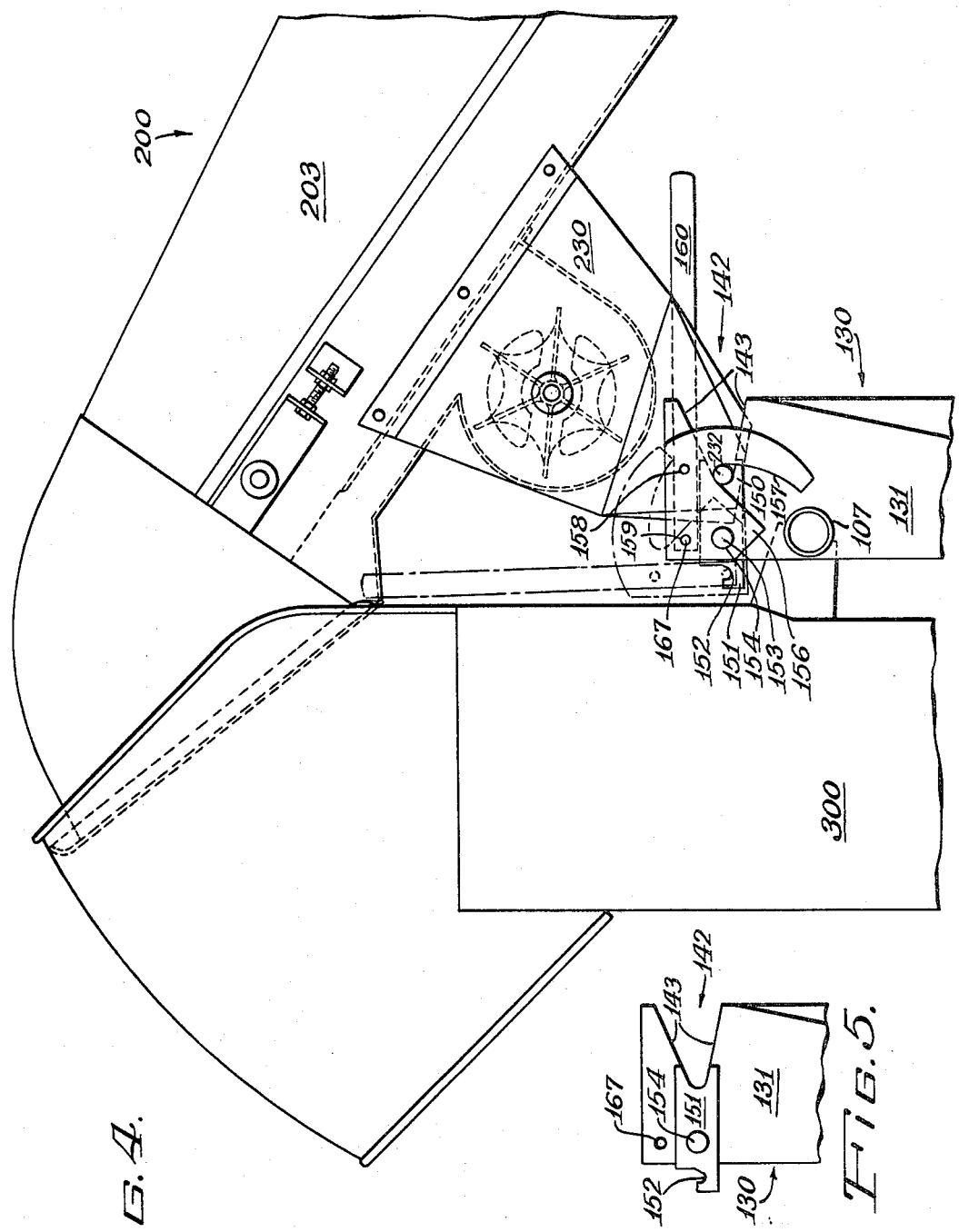

United States Patent Office 3,383,842
Patented May 21, 1968

3,383,842
PIVOT LOCK MECHANISM FOR CORN PICKERS
T. Gary Drayer and John L. Vande Wiele, East Moline, Ill., assignors to International Harvester Company, a corporation of Delaware
Filed Aug. 2, 1965, Ser. No. 476,459
3 Claims. (Cl. 56—2)

ABSTRACT OF THE DISCLOSURE

A mounting device for seating and locking an implement in position on an implement frame. The mounting device has pivoted cam plates that function to urge bars carried by the implement into seats and are automatically locked when the bars are properly seated. Operator handles are connected to the cam plates through which pivotable movement is imparted to the cam plates and by which the cam plates can be released from the locked position.

This invention relates generally to improvements in corn harvesting machines and the like, and more particularly to a new and improved pivot lock mechanism for connecting the harvesting unit to the tractor.

The general purpose of this invention is to provide a corn picking machine that can be quickly mounted and dismounted upon a tractor. The invention disclosed herein is adapted to be incorporated into the corn harvesting machine disclosed in the patent to Barkstrom et al. No. 3,320,730 filed on Feb. 24, 1965 and issued on May 23, 1967. Reference may be made to this patent for details of the corn harvesting machine that are not necessary for an understanding of the subject invention.

The corn harvesting machine disclosed herein and disclosed in the above referred to patent is of the type that are adapted to be mounted upon a conventional farm tractor. Mounting brackets are provided on the tractor and a main frame is secured to these mounting brackets, the tractor, carrying the main frame, is then driven into position with respect to the picking unit and the necessary pivotable connection between the main frame and the picking unit is accomplished. The picking unit is pivotally connected to the main frame at a point adjacent to the rear axle structure of the tractor. The forward portion of the picking unit can then be raised and lowered by oscillating it about this pivotable connection. The subject invention is directed to the means for accomplishing the pivotable connection between the picking unit and the main frame. This is accomplished by providing forwardly opening V-shape slots in the main frame into which the pivot bars for the picking unit are positioned by manipulating the tractor. The main frame includes cam plates that can be actuated by the tractor operator from his seat to accurately position the pivot bars of the picking unit into the vertex of the V-shape slots and to secure them in this position.

An object of the present invention is the provision of a pivot lock mechanism that can properly align the picking unit with the main frame and establish a pivotable connection therebetween.

Another object is the provision of a pivot lock mechanism for a corn harvesting device that can be conveniently actuated by the tractor operator from his seat.

These and other objects of the invention will become more apparent from the specification and drawings wherein:

FIGURE 2 is a perspective view of a picker unit dismounted from the tractor;

FIGURE 3 is a rear perspective view of a tractor having only the main frame mounted thereon;

FIGURE 4 is an enlarged side view of the pivot lock mechanism showing the cam plate in two positions;

FIGURE 5 is an isolated side view of the upright post seen in FIGURE 4; and

FIGURE 6 is a rear view of the pivot lock mechanism in the open position with the cam plate and handle shown in cross section for the purpose of clarity.

Figure 1:
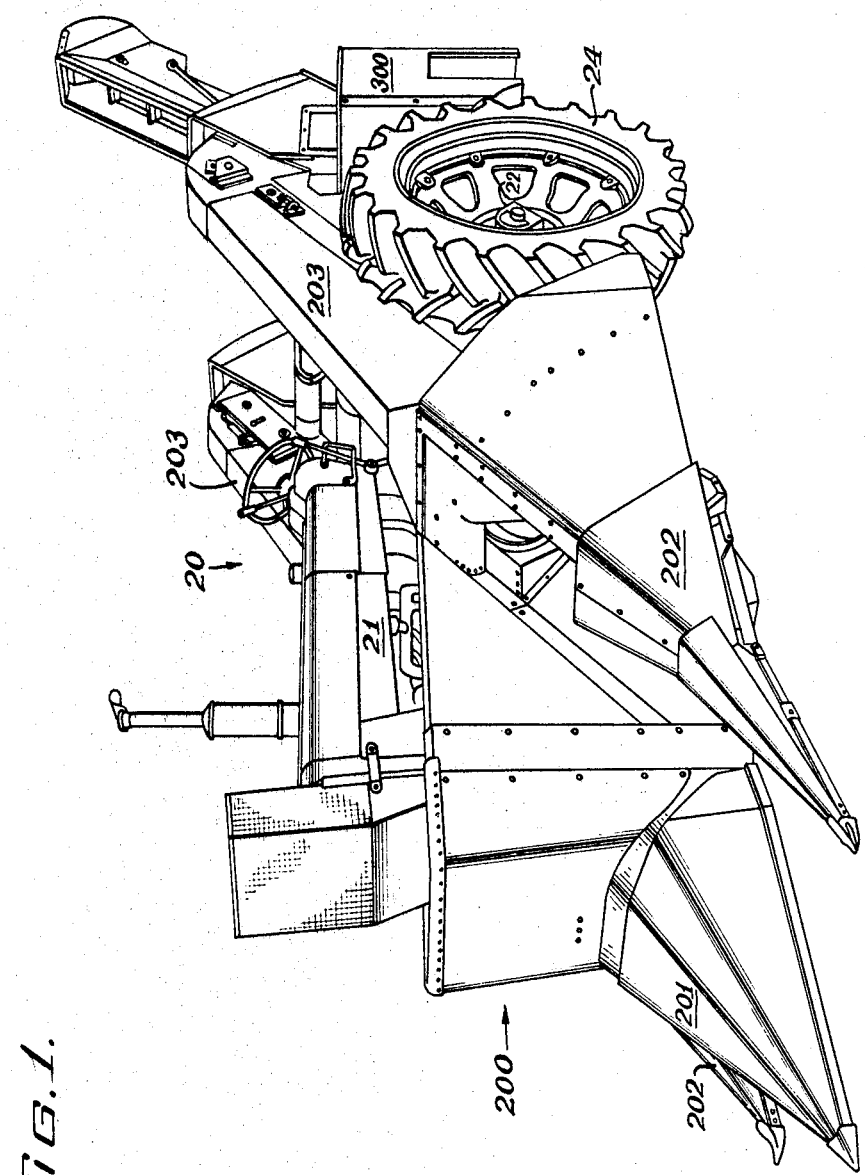
FIGURE 1 is perspective view of a tractor having the subject corn harvesting device mounted thereon.

Referring now to the drawings wherein like reference characters designate like or corresponding parts throughout the several views, there is shown in FIGURE 1 the tractor 29 having the corn picking unit 200 and the processing unit 300 mounted thereon. The tractor 20 is of the type having a longitudinal chassis 21, a rear axle unit 22 and drive wheels 24. As can be best seen in FIGURE 3 a front tractor mount 30 is secured to the longitudinal chassis 21 between the front wheels and the drive wheels 24. A pair of rear tractor mounts 33 are secured to the rear axle unit 22. The main frame 100 is connected to the tractor through the front and rear tractor mounts 30 and 33 respectively. The main frame 100 includes a vertical section 105 that is made up of a pair of upright posts 130 and a horizontal pipe 107. Each of the upright posts 130 includes a pair of vertical walls 131. The upright post 130 terminates at their upper free ends in the picker mounts 142.

Referring now to FIGURE 2 wherein the picking unit 200 is shown dismounted. It is seen that this unit includes a center divider 201, a pair of outer gathering points 202, a pair of first elevators 203 and parking stands 204. The picking unit 200 also includs a pair of sockets 221 into which arms (not shown) carried by the front portion of the main frame are inserted. A pair of downwardly extending posts 230 having beveled edges 231 and supporting the picking unit bars 232 are carried by the first elevators 203.

In mounting the picking unit on the tractor, the main frame 100 is first secured in place on the tractor and the tractor is then driven into the picking unit with the longitudinal chassis 21 positioned between the first elevators 203. The tractor is manipulated such that the picking unit bars 232 are located within the notches formed by the diverging edges 143. It is not necessary for the tractor to be in perfect alignment with the picking unit bars since misalignment in the transverse direction will be corrected by the beveled edges 231 of the downwardly extending post 230 and vertical misalignment will be compensated for by the cooperation of the diverging edges and the cam plates 155 and 156, as shall be discussed in more detail.

The invention disclosed in this application concerns the means for positioning the picking unit bars 232 in the vertex of the notch formed by the diverging edges 143 and holding it in place such that the picking unit can be oscillated about this point.

As can be best seen in FIGURES 4, 5 and 6, an outer plate 150 and an inner plate 151 are secured to the vertical walls 131 of the upright posts 130. As can be best seen in FIGURE 5 the notch formed by the diverging edges 143 extends into outer and inner plates 150 and 151 as well as the vertical walls 131. The inner plates 151 have a portion that extends rearwardly of the upright post 130 in which there is formed a notch 152 that functions as a stop for the stud 161 as shall be discused in more detail. Apertures 154 are formed in the vertical walls 131 and the inner and outer plates 150 and 151 and function to journal pivot shafts 153. Pivot shafts 153 have end portions extending outwardly from the inner and outer plates 150 and 151 upon which are secured the outer and inner cam plates 155 and 156 respectively.

The shape of the outer and inner cam plates are substantially identical and can be best seen in FIGURES 3 and 4. The cam plates 155 and 156 include cam surfaces designated 157 which function to nest the picking unit bars 232 in the vertex of the notch formed by diverging edges 143 when the cam plates are pivoted from the broken line position to the full line position as seen in FIGURE 4. As can be best realized by observing FIGURE 4, the cam surafce 157 is shaped such that as long as the picking unit bars 232 are within the confines of the notch defined by the diverging edges 143 it will be directed by the cam plates 155 and 156 into the vertex of the notch.

The cam plates 155 and 156 are pivoted by handles 160 that are fastened to the inner cam plates 156. For the purpose of fastening the handles 160 to the inner cam plates 156 first and second apertures 158 and 159 respectively are formed in the inner cam plates 156. Apertures 178 and 179 are formed in the handle and are spaced such that they can be aligned with apertures 158 and 159. As can be best seen in FIGURE 6 a stud 161 extends through the aperture 179 formed in the handle and the stud is secured to the handle as by welding or the like. The stem of the stud 161 protrudes outwardly from the handle a distance in excess of the thickness of the cam plate 156 and the inner plate 151. A bolt 162 is inserted through the aperture 158 formed in the cam plate and extends through the aperture 178 formed in the handle. A first washer 163 is positioned on the protruding portion of bolt 162 followed by a spring 164, a second washer 165 and a nut 166. Thus a resilient connection is provided between the handle and the cam plate by the bolt 162 and its associated spring 164. This resilient connection permits the free end of stud 161 to be withdrawn such that it does not project outwardly from the inner cam plate 156. Thus, to pivot the cam plates from the position shown in broken lines in FIGURE 4, to the position shown in full lines it would be necessary for the operator to grasp the handle 160, push outwardly on the handle sufficiently so that the free end of stud 161 no longer projects outwardly from the cam plate 156 and then move the handle forward and downward. When the handle reaches the full line position as seen in FIGURE 4 it is released and spring 164 exerts a force on stud 161 causing it to again project outwardly from the plate 156 and into an aperture 167 formed in the inner plate 151. With stud 161 projecting into aperture 167 the cam plate 156 is thereby locked in the full line position. Thus, no extra effort is required on the part of the operator to lock the cam plates in this position. It occurs automatically upon the release of the handle.

In dismounting the picking unit 200 from the tractor 20 the connection at the picker mounts 142 is released by the operator grasping the handle 160 exerting an outward force on them sufficient to withdraw the stud 161 from the aperture 167 and then pulling up and toward the rear. The picking unit bars 232 are then free to slide out of the slot formed by the diverging edges 143. When the cam plates and handles are in the broken line position, as seen in FIGURE 4, stud 161 engages the notch 152 which functions as a stop to prevent further rotary motion.

Obviously many modifications and variations of the present invention are possible in the light of the above teachings. It is therefore to be understood that within the scope of the appended claims the invention may be practiced otherwise than as specifically described.

What is claimed is:

1. A tractor mounted harvesting device comprising a tractor of the type having a longitudinally extending chassis, a rear wheel axle unit, drive wheels carried by said rear wheel axle unit, a front support carried by said chassis, and a rear support carried by said rear wheel axle unit; a longitudinally extending implement main frame having front and rear portions, supports on said front and rear portions for connection with said front and rear supports of said tractor for connecting the main frame to the tractor, a pair of upright posts including a pair of substantially parallel vertical walls on the rear portion of said main frame, picker mounts on the upper free ends of said upright posts, said picker mounts comprising pivot shafts journaled in said pair of parallel walls and including end portions extending outwardly therefrom, V-shaped notches formed in the forward edges of said parallel walls with the vertex at an elevation substantially parallel to said pivot shafts, cam plates carried by said end portions of the pivot shafts, each cam plate having cam surfaces that upon rotation of said pivot shafts are adapted to direct bars located in said V-shaped notches toward the vertex, locking means for locking said cam plates in a selected position, handles mounted on said cam plates to permit the tractor operator to manipulate said cam plates, said handles resiliently connected to said cam plates at one point and connected at a second point by a stud secured to said handle and extending through an aperture formed in said cam plate, said stud normally extending through and projecting outwardly from the surface of the cam plate, the resilient connection permitting said stud to be withdrawn into the aperture formed in the cam plate such that the free end of the stud does not project outwardly from the surface of the cam plate, an aperture formed in said vertical wall adapted to receive the free end of said stud to thus constitute said locking means.

2. The invention as set forth in claim 1 wherein said resilient connection includes aligned apertures formed in the handle and cam plate, a headed bolt extending through said apertures having a free end portion projecting outwardly, a coil spring surrounding said free end portion and means for holding said spring on said bolt.

3. The invention as set forth in claim 1 wherein a stop is secured to said upright post adapted to be engaged by the end portion of said stud to prevent rotation of the cam plate in one direction.

References Cited

UNITED STATES PATENTS 3,320,730   5/1967   Barkstrom _____ 56—2

ANTONIO F. GUIDA, *Primary Examiner.*